United States Patent [19]

Okada et al.

[11] Patent Number: 5,184,830

[45] Date of Patent: Feb. 9, 1993

[54] COMPACT HAND-HELD VIDEO GAME SYSTEM

[75] Inventors: Satoru Okada; Shin Kojo, both of Kyoto, Japan

[73] Assignee: Nintendo Company Limited, Kyoto, Japan

[21] Appl. No.: 899,179

[22] Filed: Jun. 15, 1992

Related U.S. Application Data

[63] Continuation of Ser. No. 462,400, Jan. 8, 1990, abandoned.

[30] Foreign Application Priority Data

Apr. 20, 1989 [JP] Japan ............................ 1-101028
Oct. 1, 1989 [JP] Japan ............................. 1-4452

[51] Int. Cl.[5] ............................................ A63F 9/22
[52] U.S. Cl. .................................. 273/433; 273/434; 273/435; 273/85 G
[58] Field of Search ............... 273/433, 434, 435, 437, 273/85 R, 85 G, DIG. 28; 364/410

[56] References Cited

U.S. PATENT DOCUMENTS

| | | | |
|---|---|---|---|
| 4,359,222 | 11/1982 | Smith, III et al. | 273/85 G |
| 4,395,760 | 7/1983 | Soski et al. | 364/410 |
| 4,438,926 | 3/1984 | Yokoi et al. | 273/85 G |
| 4,572,509 | 2/1986 | Sitrick | 273/85 G |
| 4,589,659 | 5/1986 | Yokoi et al. | 273/1 GC |
| 4,729,563 | 3/1988 | Yokoi | 273/1 E |
| 4,745,478 | 5/1988 | Nakagawa | 356/181 |
| 4,783,812 | 11/1988 | Kaneoka | 381/61 |
| 4,815,733 | 3/1989 | Yokoi | 273/1 E |
| 4,865,321 | 9/1989 | Nakagawa et al. | 273/85 G |
| 4,890,832 | 1/1990 | Komaki | 273/435 |

FOREIGN PATENT DOCUMENTS

| | | |
|---|---|---|
| 58-136192 | 9/1983 | Japan . |
| 57989 | 9/1984 | Japan . |
| 60-21784 | 2/1985 | Japan . |
| 2033763 | 5/1980 | United Kingdom . |
| 8302566 | 8/1983 | World Int. Prop. O. ........ 273/85 G |

OTHER PUBLICATIONS

Worley, Joyce "Spitball Sparky", Electronic Games, Nov. 1984, p. 86.

Primary Examiner—Jessica J. Harrison
Attorney, Agent, or Firm—Nixon & Vanderhye

[57] ABSTRACT

A hand-held electronic game machine for use with attachable/detachable memory game packs wherein the game machine includes a case of a size which may be held by a hand and capable of being sandwiched by both hands with a first switch disposed at a position such that during a game it can be operated by one thumb on a front surface of the case, a second switch disposed at a position such that during a game it can be operated by the other thumb on the first surface of the case and a third operation switch means provided in a region of said front surface where imaginary loci of both thumbs intersect with each other on the front surface, and wherein the game machine can be connected with others for simultaneous multiple player competition.

21 Claims, 12 Drawing Sheets

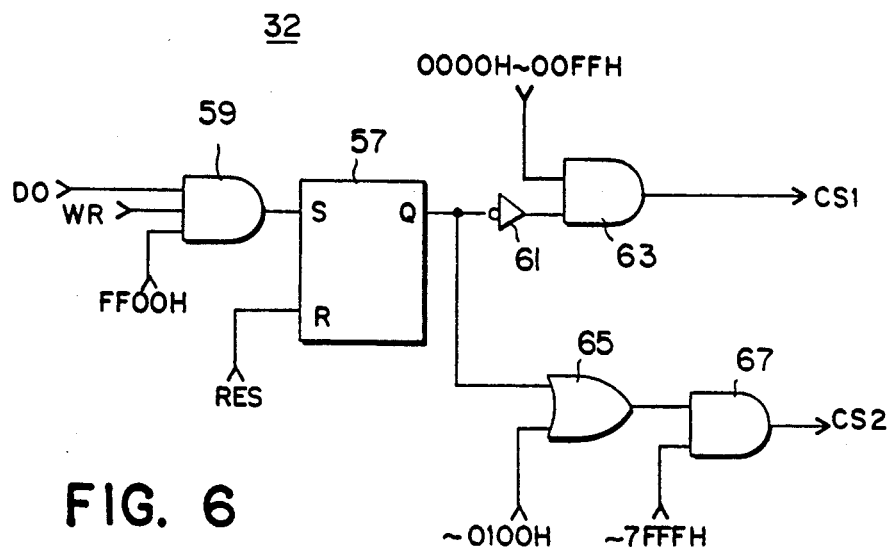
FIG. 6
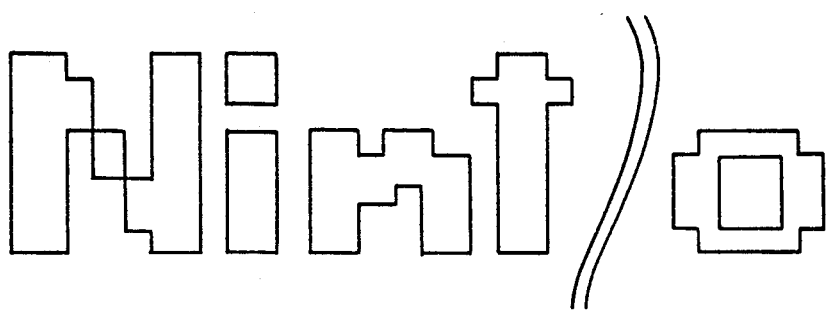
FIG. 8(A)
FIG. 8(B)

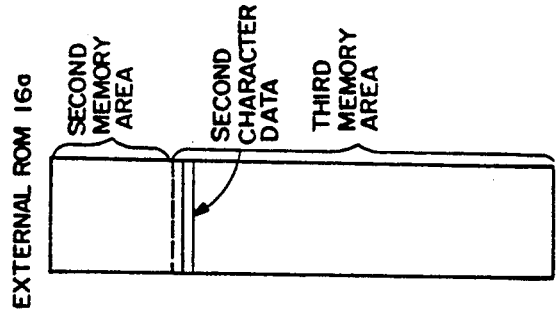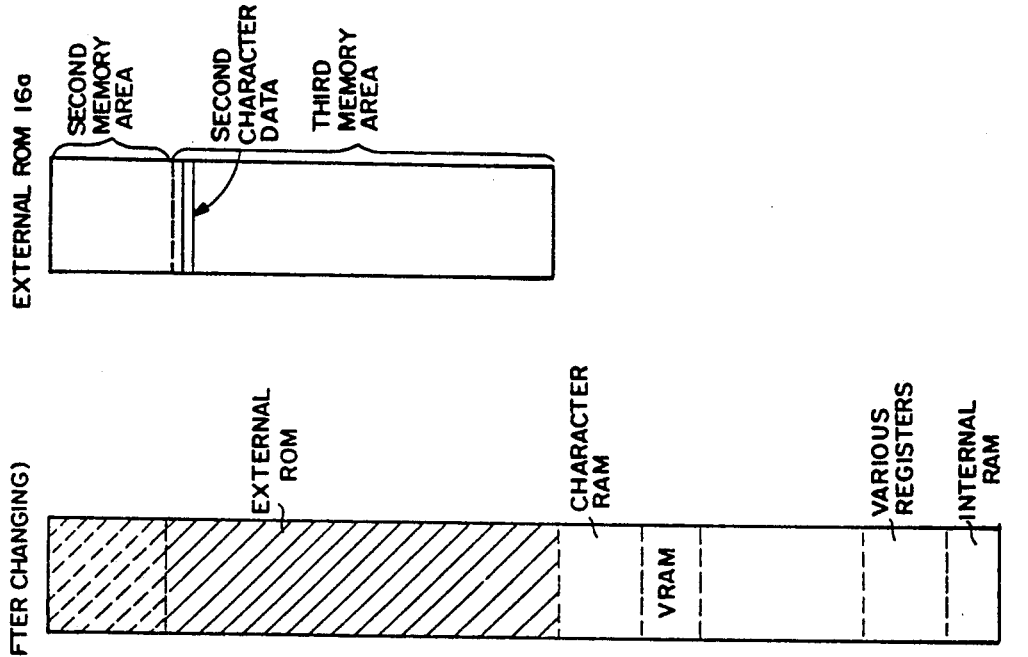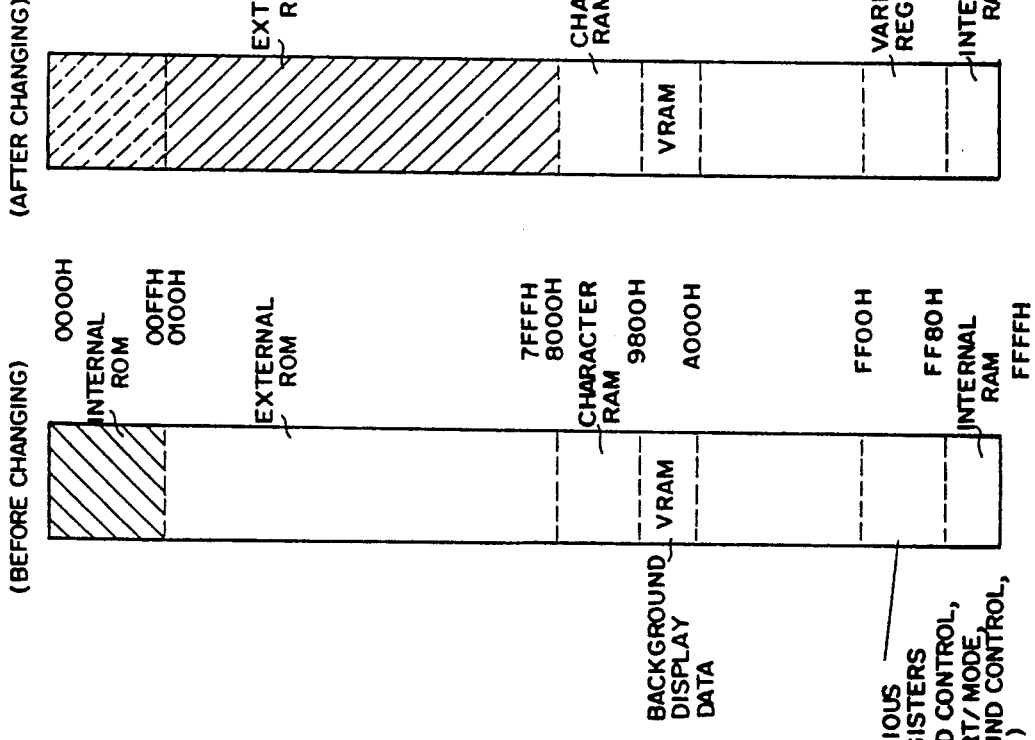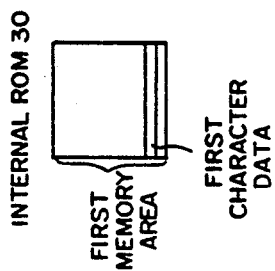

FIG. 12
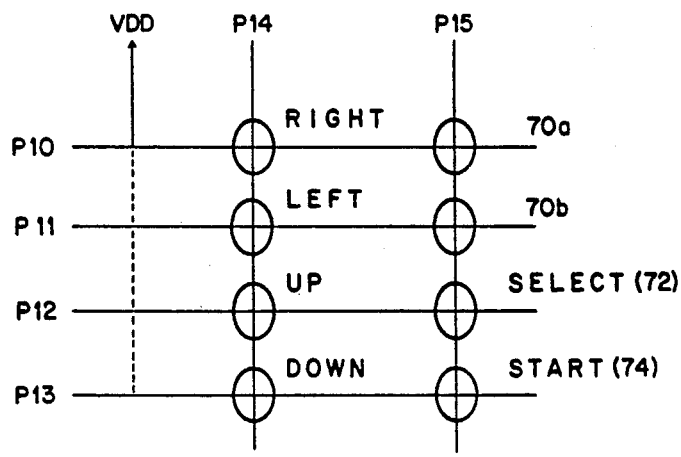
FIG. 14 BACKGROUND (BG) DISPLAY
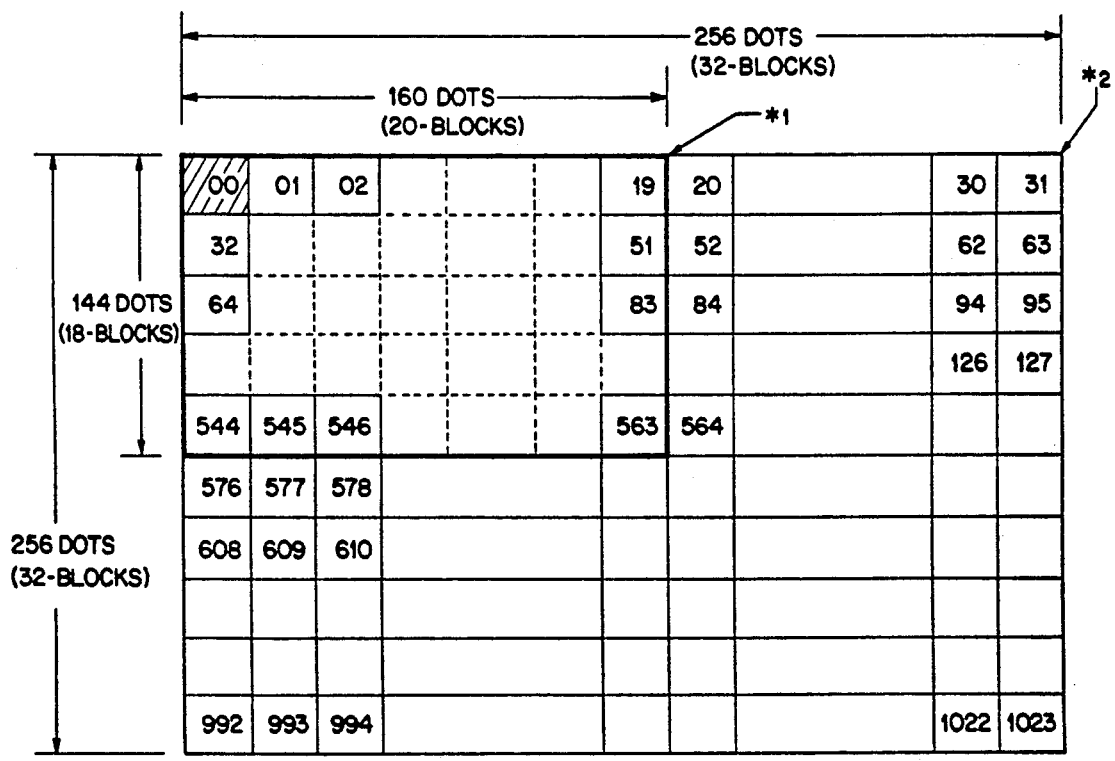

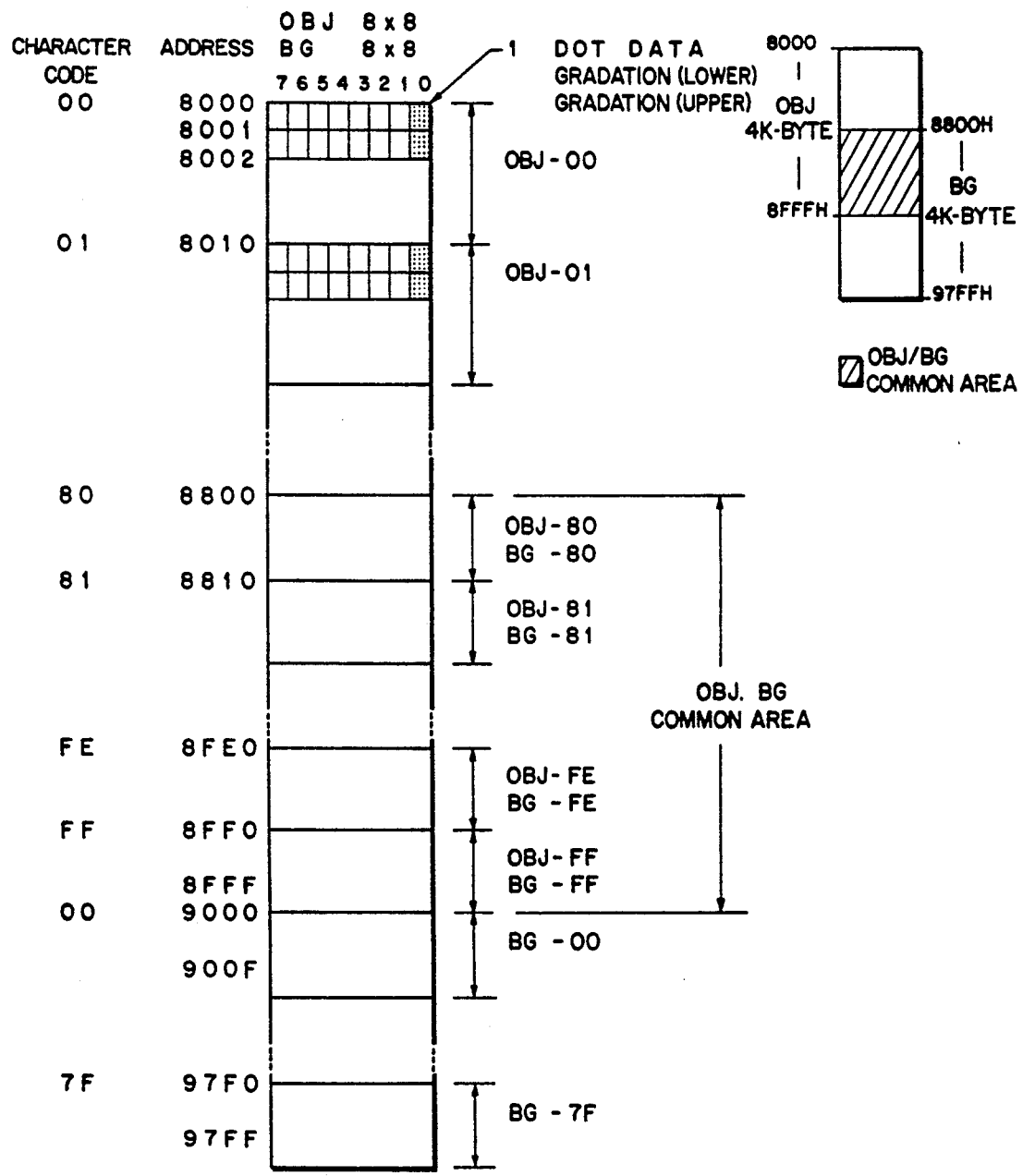
FIG. 13 CHARACTER RAM

FIG. 15A LCD DISPLAY REGISTER
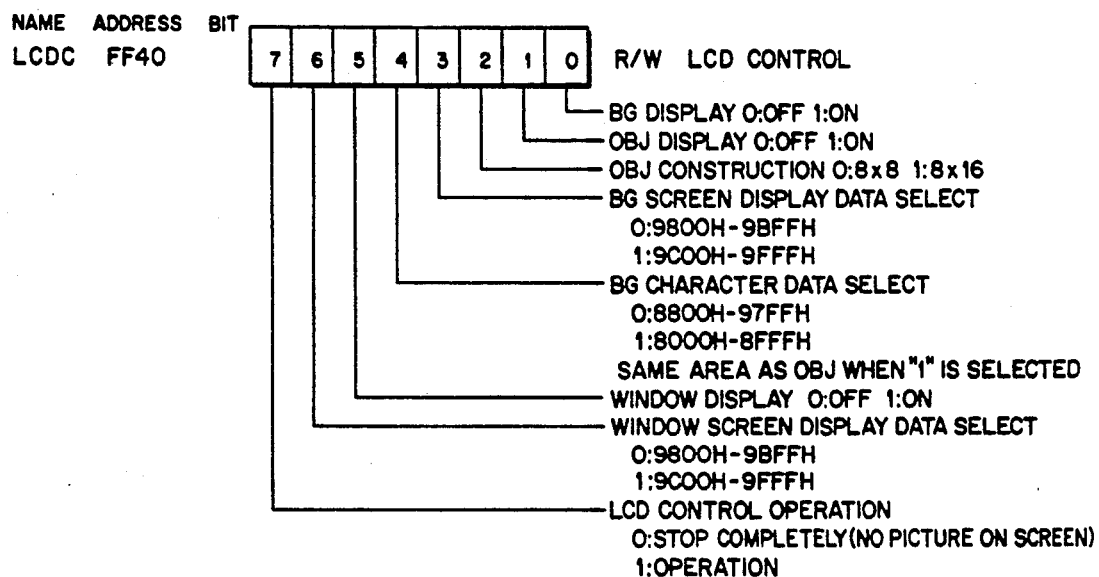
FIG. 15B
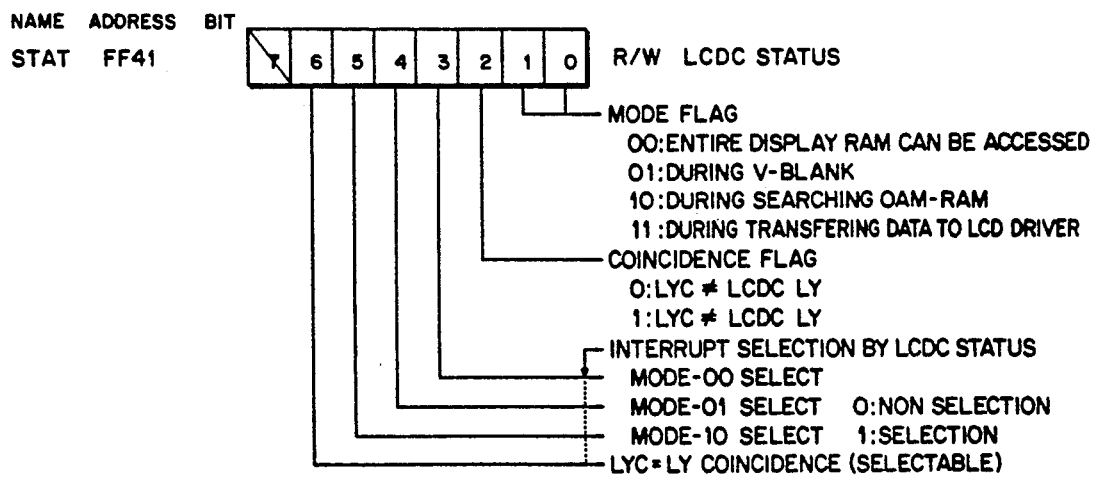

FIG. 15C

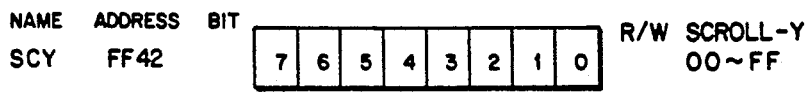

NAME  ADDRESS  BIT          R/W  SCROLL-Y
SCY   FF42                        00~FF

FIG. 15D

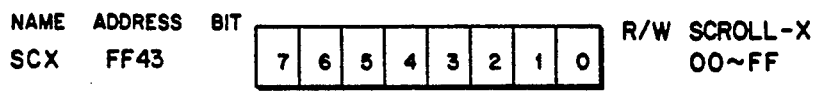

NAME  ADDRESS  BIT          R/W  SCROLL-X
SCX   FF43                        00~FF

FIG. 15E

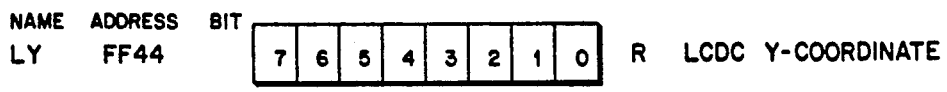

NAME  ADDRESS  BIT          R   LCDC Y-COORDINATE
LY    FF44

FIG. 15F

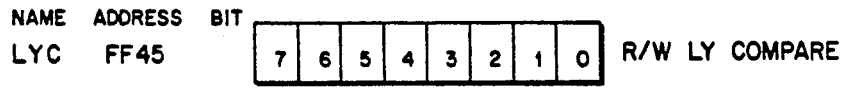

NAME  ADDRESS  BIT          R/W  LY COMPARE
LYC   FF45

FIG. 15G

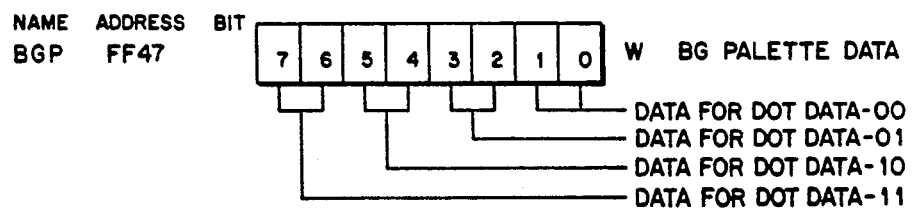

NAME  ADDRESS  BIT          W   BG PALETTE DATA
BGP   FF47
— DATA FOR DOT DATA-00
— DATA FOR DOT DATA-01
— DATA FOR DOT DATA-10
— DATA FOR DOT DATA-11

FIG. 15H

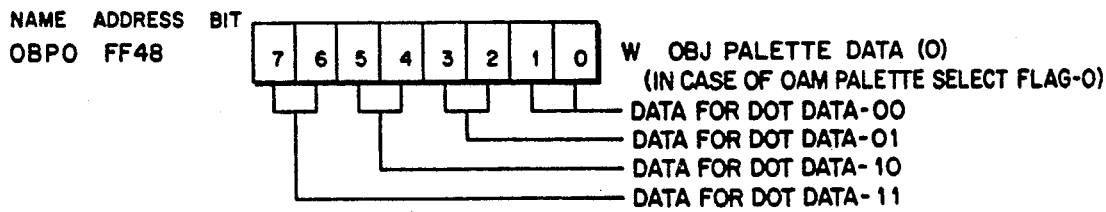

NAME  ADDRESS  BIT          W  OBJ PALETTE DATA (0)
OBP0  FF48                     (IN CASE OF OAM PALETTE SELECT FLAG-0)
— DATA FOR DOT DATA-00
— DATA FOR DOT DATA-01
— DATA FOR DOT DATA-10
— DATA FOR DOT DATA-11

FIG. 15I
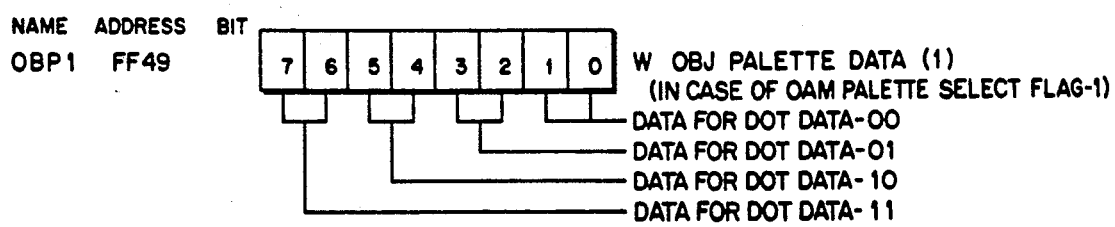
NAME: OBP1  ADDRESS: FF49
W OBJ PALETTE DATA (1)
(IN CASE OF OAM PALETTE SELECT FLAG-1)
- DATA FOR DOT DATA-00
- DATA FOR DOT DATA-01
- DATA FOR DOT DATA-10
- DATA FOR DOT DATA-11
FIG. 15J
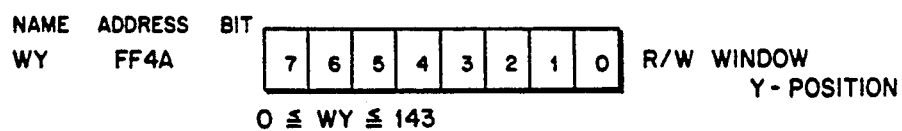
NAME: WY  ADDRESS: FF4A
R/W WINDOW Y-POSITION
$0 \leq WY \leq 143$
FIG. 15K
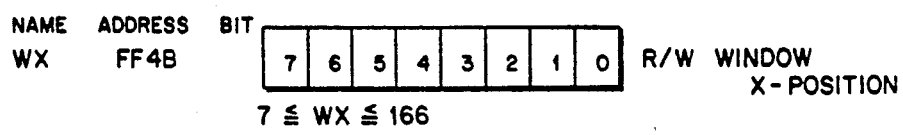
NAME: WX  ADDRESS: FF4B
R/W WINDOW X-POSITION
$7 \leq WX \leq 166$
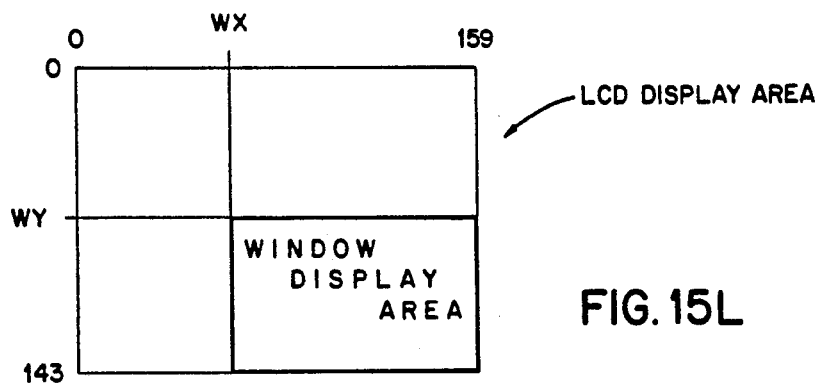
FIG. 15L

COMPACT HAND-HELD VIDEO GAME SYSTEM

This is a continuation of application Ser. No. 07/462,400, filed Jan. 8, 1990, now abandoned.

CROSS-REFERENCES TO RELATED APPLICATIONS

The subject application is related to the following copending commonly-assigned U.S. patent applications filed concurrently herewith:

U.S. Ser. No. 07/462,491, now U.S. Pat. No. 5,095,798 entitled "METHOD AND APPARATUS FOR GENERATING PSEUDO-STEREO SOUND"

U.S. Ser. No. 07/462,397 entitled "SYSTEM FOR PREVENTING THE USE OF AN UNAUTHORIZED EXTERNAL MEMORY"

FIELD OF THE INVENTION

The present invention generally relates to a hand-held electronic game which utilizes a pluggable external memory and includes several operational control switches disposed in such a manner that the game can be conveniently held in both hands with the switches being operated by the thumbs. More specifically, the invention relates to a compact, hand-held video game system of the above noted nature wherein attachable/detachable game pack external memories can be utilized for individual play or simultaneous multiple player competition via linking cable.

BACKGROUND AND SUMMARY OF THE INVENTION

As evidenced by Japanese Utility Model No. 57989/1986 laid-open on Apr. 18, 1986, games using a liquid crystal display are known. In this game, a game cartridge, attachable to a main body, incorporates a game program and an operating system program to be executed by a central processing unit within the body. The main body also includes a liquid crystal display ("LCD") system.

The present invention provides a uniquely compact video game system for portable hand-held video action involving interchangeable game packs. The game packs are in the form of pluggable memory devices including game programs involving one or more players. Where the game involves two players, for example, a linking cable is pluggably connected between two game machines with identical game program memory packs attached to each machine. Each machine case additionally includes uniquely placed operation switches allowing the machine to be sandwiched by the player's hands and operated by the thumbs.

In one exemplary embodiment, the information processing apparatus is constructed as a hand-held electronic game machine which is intended to be operated while the machine is sandwiched by the player's hands'. Such a hand-held electronic game machine includes a hand-held case; a first operation switch disposed at a position where it can be operated by the thumb of the left hand on a front surface of the case; a second operation switch disposed at a position where it can be operated by the thumb of the right hand on the front surface of the case; and a third operation switch provided in a region where an imaginary loci of the thumbs of the left hand and right hand intersect with each other on the front surface of the case.

A direction designating switch (specifically, a cross-key switch) which is utilized for designating a moving direction of a game character is arranged as the above described first operation switch, and an action key (specifically, a push-button switch) for designating one of various kinds of action or motion of the game character. For example, the depression of such a push-button switch may cause a game character to jump, use a weapon, throw a ball or the like. These first and second operation switches are usually operated during the game. The first and second operation switches are arranged at positions where they can be easily operated during game play.

The above-described third operation switch, may, for example, be a start switch for designating the start of the game and/or a select switch for selecting a mode of operation of the game. Such a third operation switch is arranged in a region where the imaginary loci of the thumbs of the both hands intersect each other. Therefore, the third operation switch is disposed to be readily operated by the thumb on either hand. Thus, the third switch may be operated during game play without requiring the user to change the position of the hands during the game.

These and other objects, features, aspects and advantages of the present invention will become more apparent from the following detailed description of the embodiments of the present invention when taken in conjunction with the accompanying drawings.

BRIEF DESCRIPTION OF THE DRAWINGS

FIG. 6 is a circuit diagram showing an exemplary memory selecting circuit such as shown generally in FIG. 5;

FIGS. 7(A) through 7(D) are a memory map showing address spaces to which CPU core can access;

FIGS. 8(A) and 8(B) are illustrative views showing examples of character data to be displayed;

FIG. 12 illustrates a key-matrix for detecting a key or switch input;

FIG. 13 is an exemplary character RAM memory map;

FIG. 14 is an exemplary VRAM memory map; and

FIGS. 15(A) through 15(L) are exemplary embodiments of various addressable registers associated with the LCD controller.

DETAILED DESCRIPTION OF THE DRAWINGS

Figure 1:
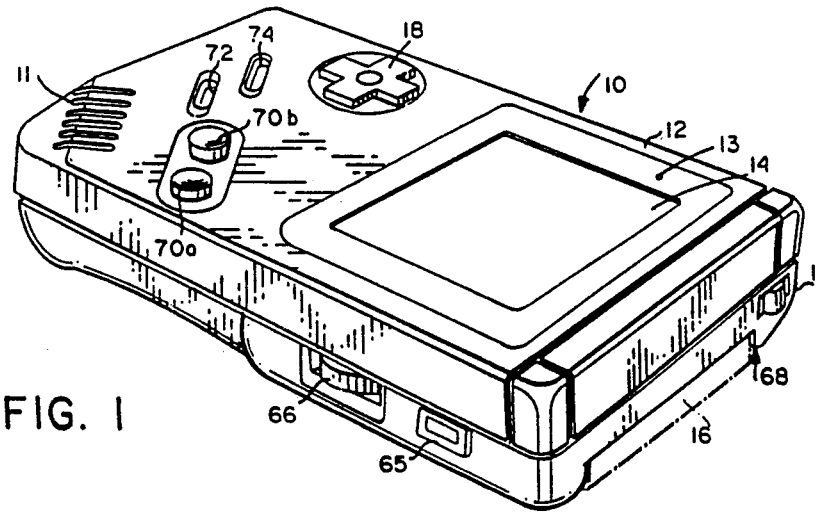
FIG. 1 is a perspective view showing an exemplary exterior housing of a game machine in accordance with an exemplary embodiment of the present invention.

FIG. 1 is a perspective view showing the exterior housing of an exemplary hand-held liquid crystal game machine in accordance with an exemplary embodiment of the present invention. This hand-held liquid crystal game machine (hereinafter referred to as "game machine") 10 includes a case 12 which is provided with an LCD panel 14 including dot display segments being arranged in accordance with a dot-matrix system on a front or upper surface thereof.

Figure 2:
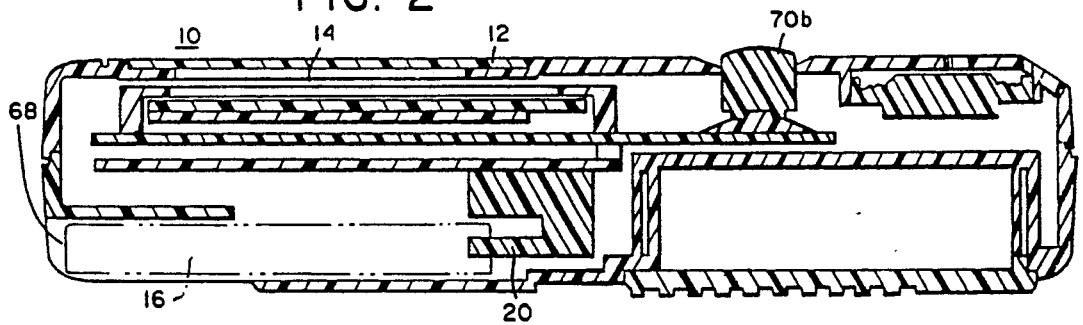
FIG. 2 is an illustrative view showing a cross-section along a line II—II in FIG. 3.

On a rear or lower surface of the case 12, an insertion port 68 (which is more clearly shown in FIG. 2) is formed at a portion opposite to the LCD panel 14. An external ROM cartridge 16 is pluggably inserted in the insertion port 68. More specifically, a 32-pin connector 20 is provided in the insertion port 68. By inserting the external ROM cartridge 16 into the insertion port 68, a connector (not shown) formed at an edge of a printed circuit board of the external ROM cartridge 16 is inserted and connected to the connector 20. Thus, the external ROM cartridge 16 can be attachably/detachably connected to the game machine 10. An external ROM 16a (FIG. 5) is incorporated in the external ROM cartridge 16. A game program is stored in the external ROM 16a. When the external ROM cartridge 16 is loaded in the game machine 10, the game program is executed such that an image is displayed on the LCD panel 14 and music for the game is generated at speaker 11 or through ear phones connected at jack 69.

A six-pin connector 65 is also provided in the case 12, whereby the game machine can be linked to other machines by an appropriate cable so that multiple player competition is possible when the external cartridges include multiple-player game programs.

Figure 3:
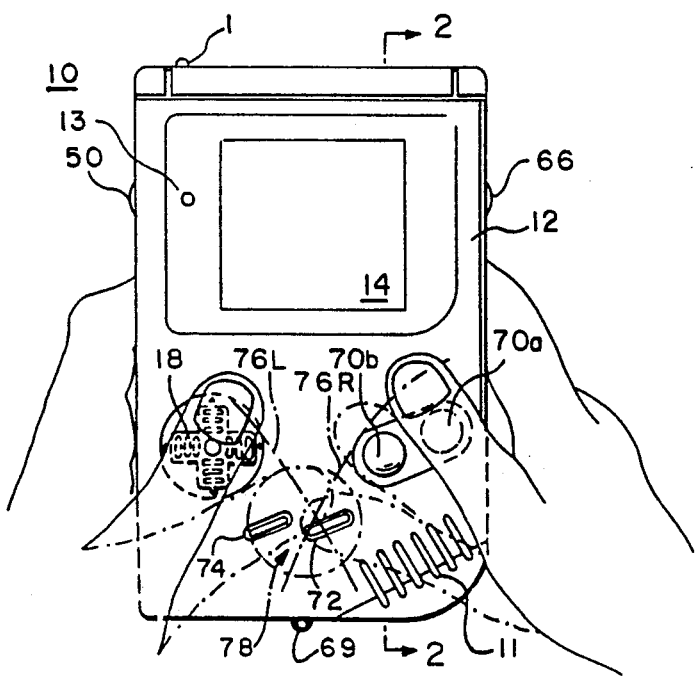
FIG. 3 is an illustrative view showing an arrangement of switches or keys such as a start switch, select switch, and so on i;: the FIG. 1 embodiment.

A cross-key switch 18, which is used when a game character being displayed on the LCD panel 14 is to be moved, is provided on the front or upper surface of the case 12 at a left side portion below the LCD panel 14, as shown in FIGS. 1 and 3. The cross-key switch 18 has four direction designating portions and, by depressing any one of the same, it is possible to move the game character upward or downward or leftward or rightward. In addition, as shown in FIGS. 1 and 3, two push-button switches 70a and 70b are provided on the front or upper surface of the case 12 at a right side portion below the LCD panel 14. These push-button switches 70a and 70b are operated when it is necessary to control the game character being displayed on the LCD panel 14 to perform various predetermined actions. For example, when the push-button switch 70a is depressed, the displayed character may appear to jump, or when the push-button switch 70b is depressed, the character may appear to throw a stone, or a ball, or launch various other objects. Thus, the cross-key switch 18 is disposed to be operated by the thumb of the left hand, which sandwiches the case 12 in cooperation with the right hand, and the push-button switches 70a and 70b are disposed to be operated by the thumb of the right hand.

Furthermore, a start switch 72 and a select switch 74 are provided on the front or upper surface of the case 12 of the game machine 10. As seen from FIG. 3, the start switch 72 and the select switch 74 are arranged in a region 78 below the cross-key switch 18 and the push-button switches 70a and 70b. In this region, imaginary loci 76L and 76R of the thumbs of both hands intersect each other. Therefore, these switches 72 and 74 are centrally disposed so as to be operated by the thumbs of any one of the left hand and the right hand (while the left hand and the right hand hold the case 12 of the game machine 10). In other words, the switches 72 and 74 may be operated without significantly changing the positioning of the hands. The select switch 74 is used, for example, to select the mode of operation of the game being displayed through the use of a menu screen. In this regard, the select switch 74 may be used to select one of a number of levels of game play. In addition, a function for selecting a "weapon" usable by a game character can be assigned to the select switch 74.

The start switch 72 is operated to start the game as selected. Therefore, it is not typically necessary to operate the start switch 72 and the select switch 74 during the game. However, since a pause (PAUSE) function is also assigned to the start switch 72 the start switch 72 may be depressed when it is desired for the game to be temporarily stopped. To start the game after such a pause, the start switch 72 must be depressed again. Furthermore, it is possible to make the start switch 72 and the select switch 74 possess many other functions.

The case 12 is additionally provided with on/off switch 1, battery power level light 13, contrast adjustment 50, and volume adjustment 66.

Figure 4:
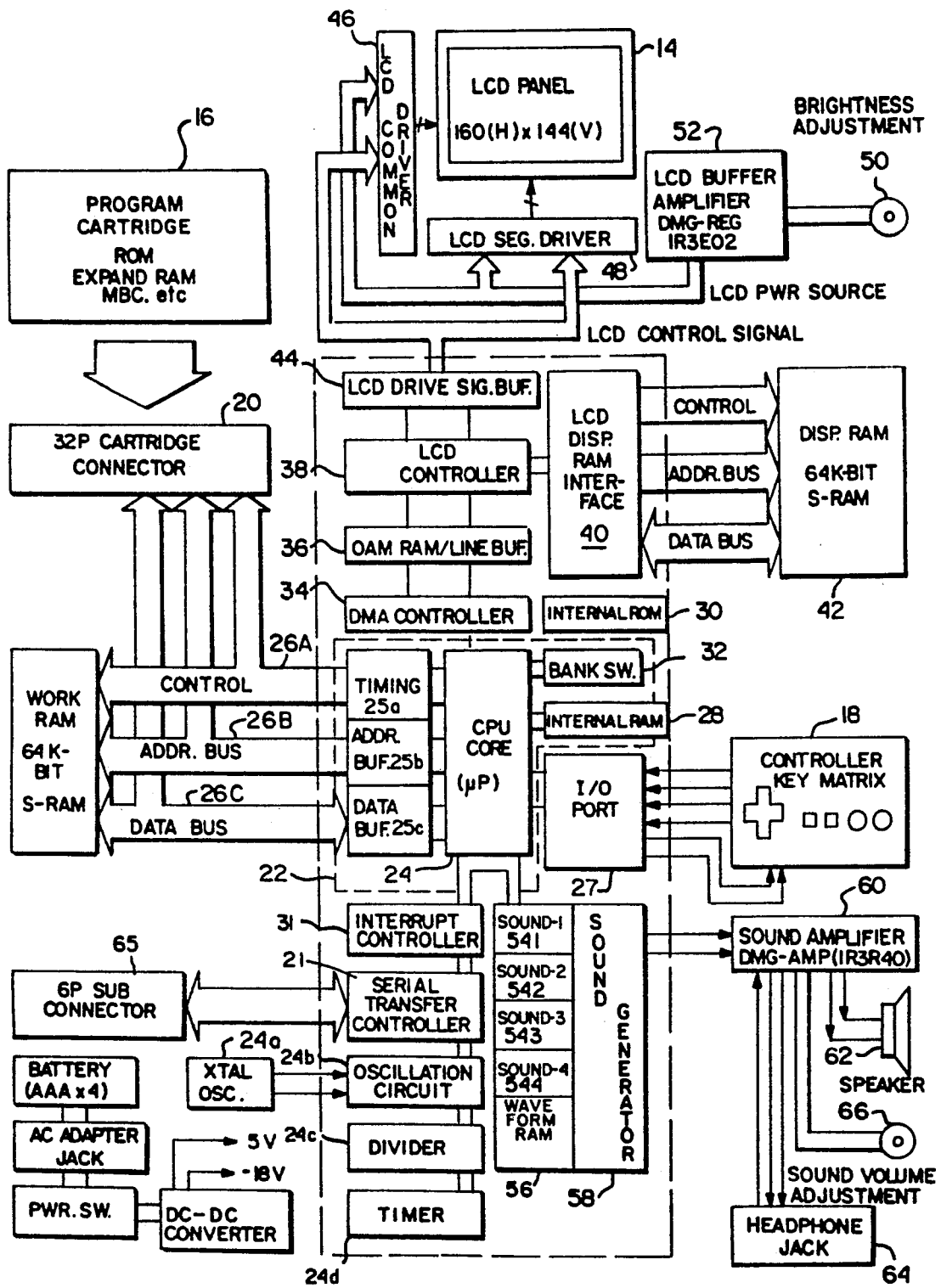
FIG. 4 is a block diagram showing the electronic components of the FIG. 1 embodiment.

With reference to FIG. 4, the above described external ROM cartridge 16 is connected to a CPU 22 housed in the case 12 by a 32-pin connector 20.

The CPU 22 includes a CPU core 24, which may, by way of example only, be implemented with a commercially available microprocessor such as a Z80. The CPU core 24 is connected to the 32-pin connector 20 via timing unit 25a and control bus 26a, address buffer 25b and address bus 26b and data buffer 25c and data bus 26c as well as a working RAM or scratch pad memory 23. Therefore, when the external ROM cartridge 16 is loaded in the game machine 10, the CPU core 24 is connected to the external ROM cartridge 16.

Figure 5:
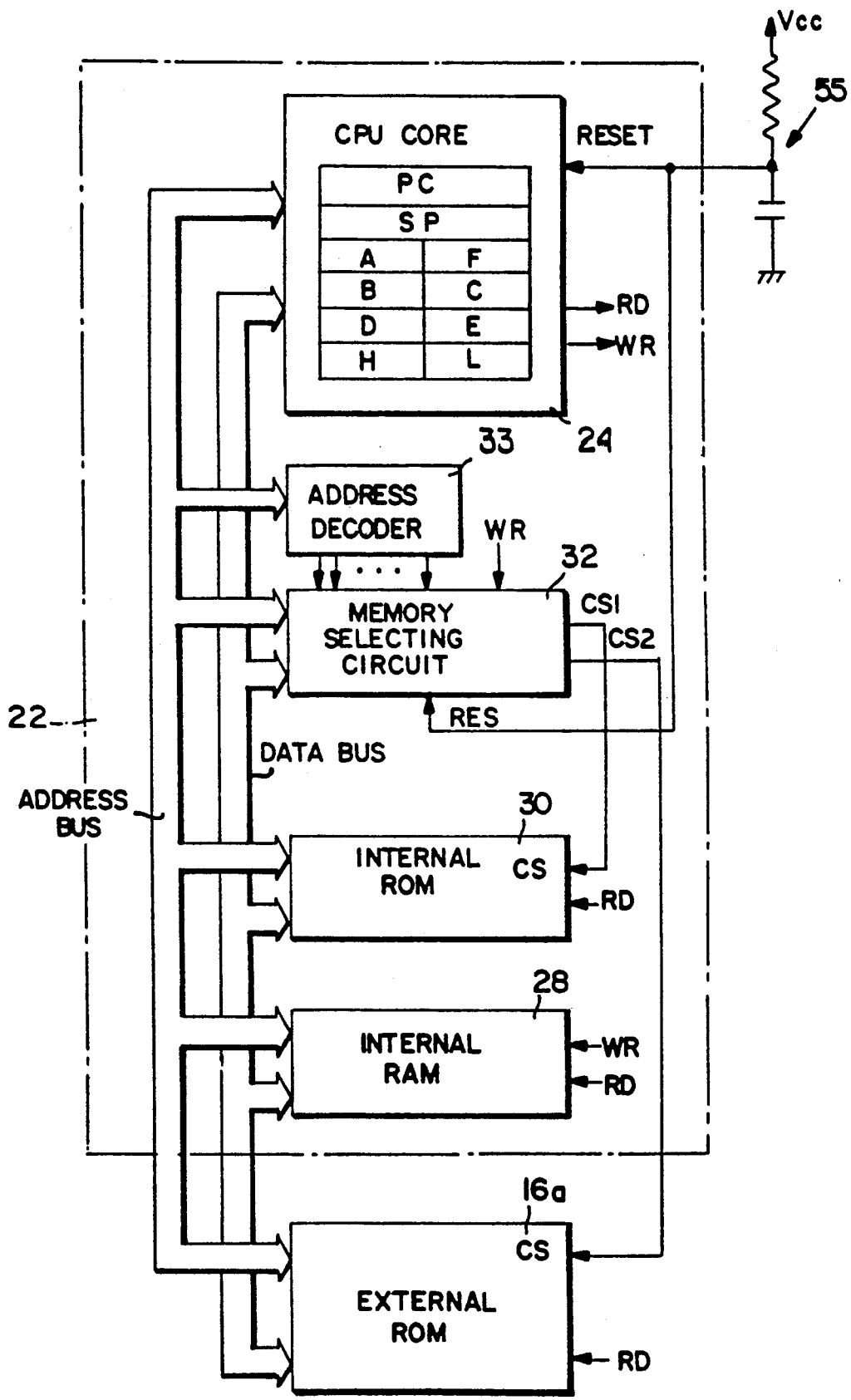
FIG. 5 is a block diagram showing a major portion of FIG. 4 in further detail.

As shown in further detail in FIG. 5, the above described CPU core 24 includes registers A, F, B, C, D, E, H and L each of which is a register of 8 bits, except for program counter PC and stack pointer SP which are 16 bit registers. The register A is an accumulator and the register F is a flag register. By using 4 bits of the 8 bits of the register F, it is possible to indicate F1 (carry), F2 (half carry), F3 (negative), or F4 (zero flag). The registers B and C, D and E, and H and L may be combined and used as a register of 16 bits. The CPU 22 preferably has an associated instruction set permitting a variety of 8 and 16 bit transfers between registers or register pairs, a variety of 8 and/or 16 bit arithmetic operations (e.g., ADD, SUB, AND/OR, INC. DEC, etc.), a variety of rotate/shift operations (e.g., rotate specified register contents left/right), a variety of bit control operations (e.g., setting a specified bit in a specified register), conditional and unconditional branch operations, subroutine call and return operations and a variety of program control operations (e.g., start, stop, no operation, etc.).

Turning back to FIG. 4, a key-matrix for detecting a key input from cross-key switch 18 is connected to the CPU core 24 via a port 27. An exemplary key-matrix is shown in FIG. 12. Lines P10–P13 in FIG. 12 corresponds to the four inputs to port 27 and lines P14 and P15 correspond to the two output lines emanating from port 27. The four inputs P10–P13 are coupled to a predetermined bias voltage Vdd. The presence or absence of a signal on lines P10–P15 is registered in a CPU addressable port register (not shown). As will be readily apparent to those skilled in the art, the state of the port register may be used to determine the control function desired by the game player. In this fashion, the depression of cross-key switch 18 may be detected by the CPU thereby resulting in character motion in the right, left, up or down directions. Also, the depression of control switches 70a, 70b, 72 or 74 may be detected and input to CPU core 24 via port 27 for implementation of the appropriate control functions. Still further depression of the control switches shown in FIG. 12 can be used to cause the transfer of data among game machines by way of 6-pin connector 65, a cable and a conventional serial register transfer port, under control of CPU core 24, serial transfer controller 21, interrupt controller 31 and external ROM cartridge 16. Such transfer of data is for the purpose of providing simultaneous multiple player competition in accordance with particular game programs stored in external cartridge 16.

The CPU core 24 is also coupled to an internal RAM 28 and an internal ROM 30. The internal ROM 30 can be accessed by the CPU core 24 only when the internal ROM 30 is selected by a memory selecting circuit 32 as is explained in detail below. Clock pulses are supplied by oscillation circuit 24b in response to crystal generator 24a. Clock pulse divider 24c provides one or more pulse rates under control of timer 24d.

Figure 9:
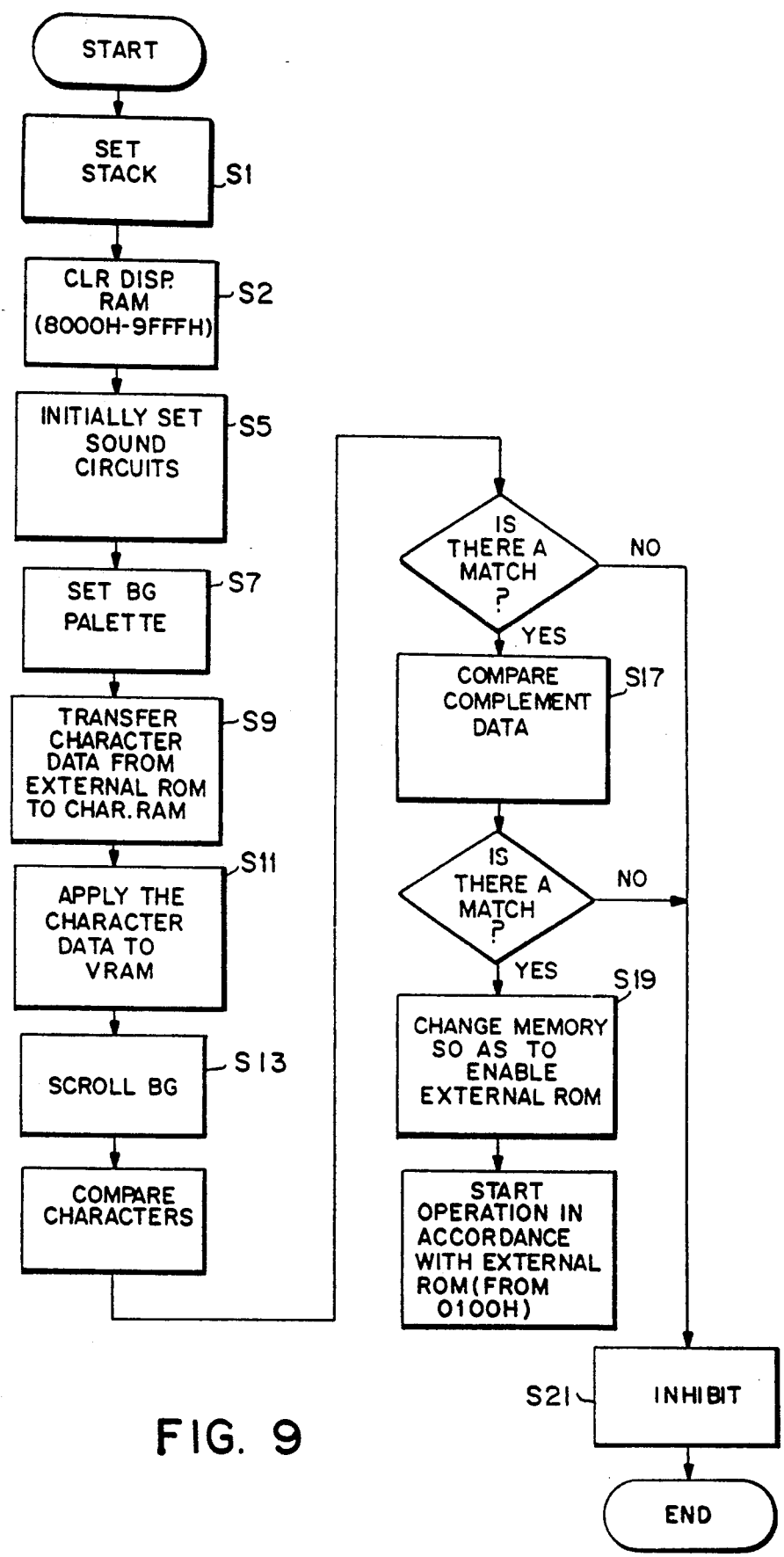
FIG. 9 is a flowchart showing a sequence of authenticating operations controlled by the processing system shown in FIG. 4.
Figure 10:
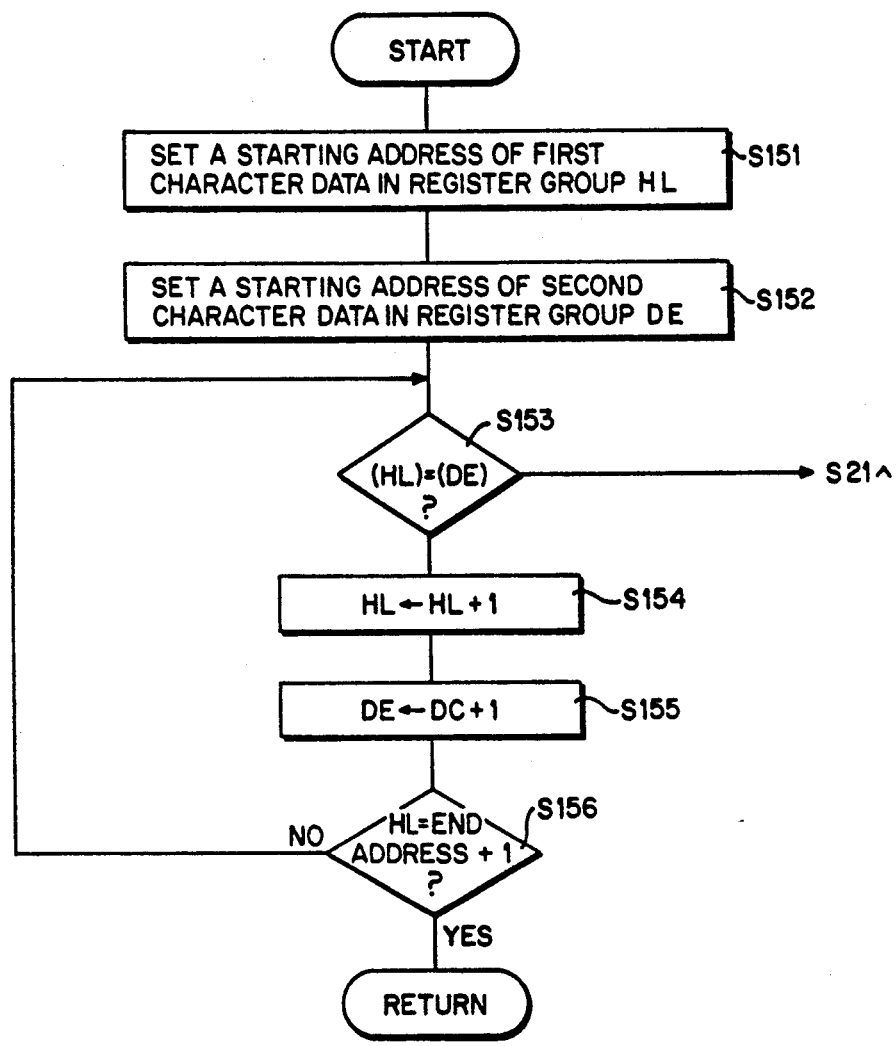
FIG. 10 is a flowchart showing a sequence of operations for comparing first character data with second character data.

Now, with reference to FIGS. 7A-7D, an exemplary CPU core address space and the nature of the data stored in internal memory 30 and the external memory cartridge 16 will be described in detail. As shown in FIGS. 7A and 7B, the internal ROM 30 has a first memory area which is designated by the addresses "0000H-00FFH" which corresponds to a first relatively small address space. The "H" indicates that these addresses are represented as a hexadecimal number. In the first memory area, first character data for displaying, for example, a trademark "Nintendo", and an external memory authenticity determining program shown by a flowchart of FIG. 9 are stored.

The external ROM cartridge 16 includes the external ROM 16a. As shown in FIGS. 7C and 7D, the memory space of the external ROM 16a is divided into a second memory area which is designated by the addresses "0000H-00FFH" (which correspond identically to the addresses defining the above-described first address space) and a third memory area (second address space) which is designated by the addresses "0100H-7FFFH". In an authorized external memory cartridge, in a region starting at the address "0100H" in the third memory area, second character data (which is the same as the first character data) is stored. A game program is stored in the remaining region of the third memory area. Preferably, in a few bytes after the second character data storing region, auxiliary data such as a code identifying a manufacturer, the name of the game, the cartridge type, the memory size, etc., are stored. Additionally, complement data relating to the auxiliary data (e.g., the complement of the sum of such data) is also stored. The complement data is used during step S17 described below in conjunction with FIG. 9. In addition, in the case where the required capacity of a game program is large, the second memory area ("0000H-00FFH") of the external ROM 16a may be used to store such a program data for the game.

Returning to FIG. 4, the CPU core 24 outputs display data to an LCD controller 38 via a line buffer 36 under the control of a DMA controller 34. The LCD controller 38 is connected to a display RAM 42 via an LCD display RAM interface 40 and control, address and data busses. Although not shown, the display RAM 42 includes a character RAM and VRAM of the nature generally shown in FIG. 7. Detailed exemplary memory maps of the character RAM and the VRAM memory areas are found FIGS. 13 and 14, respectively. The exemplary map of the VRAM as illustrated in FIG. 14 includes 1024 blocks (32 ×32) of character code representing background display data. Although only 360 (18 ×20) of the 1024 blocks are displayed on the LCD screen at any particular time, the selected area to be displayed can be changed by changing the data in the vertical and horizontal scroll registers (SCY and SCX) of the LCD controller 38.

The LCD controller 38 operates under the control of CPU 22 via various addressable control/status registers which are located in the CPU address space as shown generally in FIG. 7. These registers include an LCD display register, LCD controller status register, horizontal and vertical scroll registers, LCDC vertical line identification register, and moving object and background palette (e.g., 2 bits identifying 1 of 4 gradations of shaded color) data. The LCD display register controls the nature of the display, and the status register indicates the current status of the LCD controller. Every dot of the background display data is available by changing the data of the horizontal vertical scroll registers. The LY and LYC registers indicate and control the vertical line of the display to which data is presently being transferred by way of the display drivers. The X and Y window position registers control that portion or window of the LCD display area in which the OBJ character as well as the BG character data appears. Further details regarding these registers and their functions may be found in FIGS. 15(A) through 15(L).

The LCD control 38 converts display related data output from the CPU core 24 into an LCD drive signal which is output from the display RAM 42. More specifically, the display data from the CPU core 24 designates addresses of the character RAM and the VRAM (video RAM) such that a character (or object) signal and a background signal are output from the character RAM and the VRAM. Respective LDC drive signals are composed by the LCD controller 38.

The LCD drive signals are applied to an LCD common driver 46 and an LCD segment driver 48 through an LCD drive signal buffer 44. Therefore, by means of the LCD common driver 46 and the LCD segment driver 48, an image in accordance with the display related data from the CPU core 24 can be displayed on the LCD panel 14. More specifically, the LCD panel may, for example, define a 144×160 matrix of pixels or dots, each having a corresponding unique "intersecting" common electrode/segment electrode combination. The LCD common driver 46, Which drives the lines connected to the common electrodes, may for example, be a Sharp LH 5076 F. The LCD segment driver 48, may for example be a Sharp LH 5077 F. These display drivers receive data from the LCD drive signal buffer 44, which receives data indirectly from the CPU via the display RAM 42, the LCD RAM interface 40 and the LCD controller 38.

In addition, there is an intensity level control 50 which is connected to an LCD buffer amplifier 52 such that the intensity of the LCD panel 14 can be adjusted by operating the intensity level control.

In addition, as shown in FIG. 5, a chip select signal CS1 or CS2 is output from the memory selecting circuit 32. A reset signal from a reset circuit 55 is applied to the CPU core 24 and the memory selecting circuit 32. The reset signal is output when a power switch (not shown) of the game machine 10 is turned on, and therefore, the CPU core 24 and the memory selecting circuit 32 are initially reset at that time. Then, a read signal RD and write signal WR are output from the CPU core 24, which are suitably input to the external ROM cartridge 16, internal RAM 28, internal ROM 30 and the memory selecting circuit 32. In addition, as will be described further below an address decode signal is given to the memory selecting circuit 32 via an address decoder 33.

As shown in FIG. 6, the memory selecting circuit 32 includes an RS flip-flop 57. A set input S of the RS flip-flop 57 receives an output of an AND gate 59 which receives three inputs including a signal DO, the write signal WR and a detecting signal, i.e., indicated the decoding of the address data "FF00H". The signal DO is the least significant bit of the data is stored in location "FF00H". The decoded signal of the address data "FF00H" is output from the address decoder 33 when an output of an AND gate (not shown) which detects that all bits A0-A7 of the address data are "0", that is, the least significant two digits in the hexadecimal representation are "00" and an output of an AND gate (not shown) which detects that all bits A8-A15 of the address data are "1", that is, the most significant two digits in the hexadecimal representation are "FF" are both output. The reset input R of the RS flip-flop 57 is coupled to the reset signal RES from the reset circuit 55 (FIG. 4). Then, the non-inverted output Q of the RS flip-flop 57 is applied to one input of an AND gate 63 through an inverter 61 and to one input of an OR gate 65. A decoded signal indicating address data "0000H-00FFH" is applied to the other input of the AND gate 63. A decoded signal which corresponds to the few bytes (wherein the second character data is stored) starting at the address data "0100H" is applied to the other input of the OR gate 65. The decoded signal of the address data "0000H - 00FFH" is the inversion of the bits A8-A15 of the address data being OR'ed. The decoded signal of the addresses from the address data "0100H" to the address corresponding to the number of bytes storing the second character data is the bits A8-A14 of the address data which are OR'ed. Then, an output of the OR gate 65 is used as an input to an AND gate 67 together with a decoded signal of the address "—7FFFH" which is the inversion of the bit A15 of the address data. The outputs of the two AND gates 63 and 67 become the aforementioned chip select signals CS1 and CS2, respectively.

In operation, when the power switch (not shown) is turned on, the reset signal is output from the reset circuit 55 and therefore, the RS flip-flop 57 is reset. Therefore, the non-inverted output Q becomes "0". At this time, if the address data from the CPU core 24 is before "00FFH", the chip select signal CS1 is output from the AND gate 63. The chip select signal CS2 from the AND gate 67 is output as "1" when the address data is "0100H" or greater but not above "7FFFH". Therefore, in the state where the chip select signal CS1 is output, the memory space which is represented by oblique lines rising rightward in FIG. 7(B) may be accessed by the CPU core 24 and thus it becomes possible to read the first character data from the internal ROM 30. When the chip select signal CS2 is output, a memory space which is represented by oblique lines lowering rightward in FIG. 7(C) may be accessed by the CPU core 24 and thus it is possible to read the second character data which is stored after the address "0100H" in the external ROM cartridge 16.

On the other hand, in the case of memory changing or selecting, if the write signal WR is output from the CPU core 24 and "1" is stored in the data bit D0 in the address "FF00H", the output from the AND gate 59 becomes "1" and thus RS flip-flop 59 is set. Therefore, the non-inverted output Q becomes "0", AND gate 63 is disabled, if the address data exceeds "00FFH" and if so the chip select signal CS1 becomes "0" and the chip select signal CS2 from the AND gate 67 becomes "1". However, if the address data exceeds "8000H", the chip select signal CS2 becomes "0". Therefore, at times before or after the memory chips are changed or selected by the memory selecting circuit 32, the memory for the CPU core 24 is constructed as shown by the oblique lines in FIG. 7. That is, when the chip select signal CS2 is output, it is possible to execute the program data stored in the addresses "0100H-7FFFH" of the external ROM cartridges 16.

In addition, the character RAM, VRAM, various control and status registers and internal RAM, are always accessible to the CPU core 24 since the chip select signals CS1 and CS2 are not required to access these location.

Next, with reference to FIG. 8-11, the operation of the external memory unit authentication technique in accordance with an exemplary embodiment of the present invention will be described.

As reflected by steps S1, S3, S5, and S7 of FIG. 9, the system is initialized. More specifically, in the step S1, a predetermined value is set in the stack pointer register SP (FIG. 5) of the CPU core 24 and, in the step S3, the memory area designated by the addresses "8000H-9FFFH", that is, the display RAM 42 is cleared. Then, in the step S5, the various registers utilized by sound circuits 541-544, 56, 58, 60, 62, 64 and 66 are initially set. These registers are described in the applicant's copending application Ser. No. 07/462,491, now U.S. Pat. No. 5,095,798 and entitled "Electronic Gaming Device with Pseudo-Stereophonic Sound Generating Capabilities", which application is hereby expressly incorporated by reference herein. Additionally, in step S7, BG (background) pallet data is loaded in a pallet register (not shown) included in the LCD controller 38 by the CPU core in accordance with program data stored in the internal ROM 30. The pellet data defines 2 bits of gradation data to be associated with the character data to enable 4 different gradations of shaded color data to be output to the LCD.

In the following step S9, when the address data "0100H -" is output by the CPU core 24 in accordance with the program data stored in the internal ROM 30, the chip select signal CS2 is output by the above described memory selecting circuit 32. In response thereto, the second character data is read from the external ROM cartridge 16 and is transferred to the character RAM area included in the display RAM 42. At this time, preferably, in order to create a display which can be easily seen with fewer character data, the second character data is transferred while being processed to enlarge the character, for example, twice in length and breadth on the LCD panel 14. Then, in order to display a desired character at a predetermined coordinate position, in step S11 the character code of the desired character is applied to the VRAM area of the display RAM 42 such that the display position thereof corresponds to a predetermined position in the VRAM. Then, in the step S13, the second character read from the external ROM cartridge 16 is displayed on the LCD panel 14 for a predetermined time period while the same is scrolled. For example, the character "Nintendo" representative of the registered trademark as shown in FIG. 8(A) can be enlarged twice in length and breadth and displayed as shown in FIG. 8(B). Since such an enlargement process is readily implemented by controlling the character RAM, a detailed description thereof will be omitted here. Although enlargement processing is preferred, if desired the character data as shown in FIG. 8(A) may be displayed as it is without enlargement processing.

Next, in the step S15, after the character data has been displayed the first character data "Nintendo" which is stored in the predetermined area of the internal ROM 30 and the second character data "Nintendo" are compared with each other. More specifically, in the step S151 of FIG. 10, the starting address of the first character data of the internal ROM 30 is set in the register group HL of the CPU core 24. In step S152, the starting address of the second character data of the external ROM cartridge 16 is set in the register group DE of the CPU core 24. Then, as shown in the step S153, it is determined whether the character data which are designated by the address data loaded in the two register groups HL and DE are wholly or completely coincident with each other or not. If the both character data are coincident with each other, in the steps S154 and S155, the address data in respective register groups HL and DE are incremented and thereafter, the same comparison operation is repeated until the value of the register group HL becomes "the end address +1" in the step S156. Then, if there is not a match, an inhibiting process in the step S21 is entered.

When the comparison of the first and second character data in the step S15 is terminated, as previously noted, a checking operation is executed in step S17 based upon the complement data of the auxiliary data stored in external ROM 16a, such as the ROM size or the like, the code of a manufacturer, the name of the game, the nature of the cartridge memory (ROM only, or ROM plus RAM), et cetera. In this regard, all the auxiliary data may, for example, be summed, and the complement of such a sum computed and stored as a complement number. Then, if the comparison between calculated complement number and the stored complement number results in a mismatch, the inhibiting process of the step S21 is entered.

In the case where the first and second character data become coincident with each other and the complement data are also coincident in the comparison processes in the step S15 and S17, the CPU core 24 in step S19 outputs the write signal WR. In response, as previously described with reference to FIG. 6 and FIG. 7, the RS flip-flop 57 of the memory selecting circuit 32 is set and thus the chip select signal CS2 is output. Therefore, after step S19, the game program data stored in the addresses "0100H-8000H" of the external ROM cartridge 16 can be read and executed. Thereafter, the internal ROM 30 is not selected and, therefore, it is not possible to access the same by way of CPU core 24.

In the following step 20, a game processing operation in accordance with the program data of the external ROM 16a is started. More specifically, the CPU core 24, in accordance with the program data stored in the third memory area of the external ROM 16a, transfers a background character data (dot data) to the character RAM area included in the display RAM 42. At the same time, the BG pallet data and the character code, which designates the background character to be displayed and its display position on the LCD panel 14, are transferred to the VRAM area. Furthermore, the CPU core 24 reads the character codes of the object character to be displayed on a single screen the display coordinate data and the attribute data from the third memory area of the external ROM 16a and applies them to the LCD controller 38 through the DMA controller 34 and the line buffer 36. In response thereto, the LCD controller 38 executes a process for displaying the image in which the background character and object characters are combined with each other on the LCD panel 14. More specifically, the composite data in which the character data of the objects of one line and the background character data stored in the VRAM area are combined and are temporarily stored in the LCD drive signal buffer 44 by the LCD controller 38. Then the LCD controller 38 sequentially applies the dot data to the drivers corresponding to the dot positions in a direction of line, i.e., row selecting data to the LCD segment driver 48 and the data for sequentially selecting the columns of the respective lines to the LCD common driver 46. The dots where both the row and column are selected are driven for a short time period. In other words, data representative of whether or not the respective dots of the object characters and the background character are to be driven to display are applied to the LCD segment driver 48 and the common driver 46 by the LCD controller 38, whereby the composite image can be displayed on the LCD panel 14. By repeating such operations in a high speed, sequential manner, the driven dots are "displayed" by the density or contrast being different from that of other dots. Moreover, in accordance with a selected combination of driven dots, an arbitrary character can be displayed on the LCD panel 14.

Figure 11:
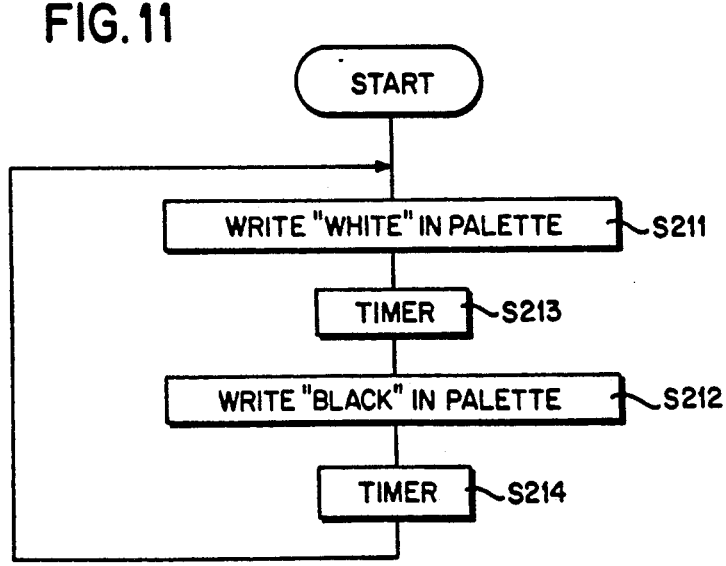
FIG. 11 is a flowchart showing a sequence of operations in an inhibiting process when a first character data and a second character data are inconsistent with each other.

In addition, preferably, if inconsistency is detected in either one of the two comparison steps S15 and S17, the CPU core 24 executes the inhibiting process of the step S21. More specifically, as shown in FIG. 11, in the steps S211 and S212, the CPU 24 writes "white" and "black" in the BG palette, and the LCD panel 14 is driven for a predetermined time period that is controlled by a timer as indicated by steps S213 and S214. In other words, in this embodiment, if the first and second character data are not coincident with each other, the LCD panel 14 is wholly turned on or off or flashed, whereby the operator or user is notified that the external ROM cartridge which is loaded at that time is not an authorized one.

At this time, since the second character data of the external ROM 16a in the external ROM cartridge 16 has been displayed in the previous step S9, the operator or user will know the reason is that the external ROM cartridge is an unauthorized cartridge.

In addition, as seen from FIG. 11, the inhibiting process routine cannot return to the main routine of FIG. 9, the memory blank changing step done in the step S19 is inhibited thereafter and thus, the unauthorized external ROM cartridge can not be used.

In addition, in the above described embodiment, a trademark such as "Nintendo" is displayed as the second character data. In the case of an external ROM cartridge which is copied such that the both character data are coincident with each other, the manufacturer's trademark will have been used in an unauthorized manner.

In addition, in the above described embodiment, it was determined whether or not the first and second character data is wholly coincident with each other. However, alternatively, a check need only be made to determine whether the first and second character data have a predetermined relationship.

Furthermore, in the inhibiting process routine as shown in FIG. 11, as described the flashing of the LCD panel is repeated. However, if desired, a sentence warning that the external ROM cartridge being attached at that time cannot be used in this game machine may be displayed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hand-held electronic game machine, comprising:
   a case of a size which may be held by hand and having a subsonically rectangularly shape defined by a front surface, a rear surface, two latitudinal side surfaces, a lower side surface and an upper side surface, each of said two longitudinal side surfaces being of greater length than each of said lower side surface and said upper side surface, said case being sandwiched by both hands during game play, said front surface having an upper front surface portion bounded by an upper portion of each of said longitudinal side surfaces and a lower front surfaced portion bounded by a lower portion of each of said longitudinal side surfaces;
   a first operation switch disposed on a right portion of said lower front surface portion of said case such that during game play it can be operated by a thumb of a player's right hand sandwiching said case;
   a second operation switch disposed on a left portion of said lower front surface portion of said case such that during game play it can be operated by a thumb of a player's left hand sandwiching said case;
   a dot-matrix liquid crystal display panel including a display screen defining a matrix of rows and columns of dots disposed on said upper front surface portion such that in use said display shown is positioned above said first operation switch and said second operation switch;
   an insertion portion formed on said upper side surface of said case and extending, in use, behind said dot-matrix liquid crystal display panel in said case;
   an external memory attachably and detachably insertable into said insertion portion from said upper side surface of said case for storing a game program and background character data and moving object character data with which images for a game are displayed on said display screen;
   game processing means housed in said case for reading said game program and said background character data and moving object character data from said external memory and controlling the display of moving objects on said display screen in response to the actuation of said first operation switch and said second operation switch and for controlling the display of background characters on said display screen;
   a connector housed in said case for connecting said external memory being inserted in said insertion portion to said game processing means;
   a memory housed in said case and associated with said game processing means for storing said background character data and said moving object character data read from said external memory by said game processing means and transferred through said connector;
   display signal generating means housed in said case for generating display signals for displaying background characters and moving objects on the basis of said background character data and said moving object character data stored in said memory;
   a driver for driving said dot-matrix liquid crystal display panel in response to said display signals generated by said display signal generating means to display said background characters and said moving objects on said display screen, said driver including a first driver for driving said dot-matrix liquid crystal display panel in columns and a second driver for driving said liquid crystal display panel in rows.

2. A hand-held electronic game machine in accordance with claim 1, further comprising third operation switch means disposed in a central region of said lower front surface portion, such that in use the third operation switch means is disposed where loci of the thumbs of both hands intersect each other on the front surface of said case,
   said game processing means being responsive to said third operation switch means to start a game, cause the operation of the game to pause, or to select the kind of game to be played.

3. A hand-held electronic game machine in accordance with claim 2, wherein said third operation switch means includes two switches one of which is included in a locus of the thumb of said right hand and with said first operation switch and the other of which is included in a locus of the thumb of said left hand and said second operation switch.

4. A hand-held electronic game machine in accordance with claim 1, wherein said display panel is disposed above and between said first operation switch and said second operation switch.

5. A hand-held electronic game machine in accordance with claim 4, further comprising a rotational knob provided in the vicinity of said liquid crystal display panel at one of said longitudinal side surfaces of said case to control the display contrast.

6. A hand-held electronic game machine in accordance with claim 1, wherein said game processing means includes means responsive to a connected external memory for detecting whether said connected memory is an authorized or unauthorized memory.

7. A hand-held electronic game machine in accordance with claim 6 wherein the game processing means includes further means responsive to said detecting means for preventing an unauthorized external memory from being used for executing a game program.

8. A hand-held electronic game machine in accordance with claim 1, further comprising a contrast knob arranged at said upper portion of one of said longitudinal side surfaces of said case and means for changing contrast on said display screen in response to operation of said contrast knob.

9. A hand-held electronic game machine, comprising:
a case of a size which may be held by hand;
said case having a substantially rectangularly front surface having a game display related first half portion and game control related second half portion;
a dot-matrix liquid crystal display having a display screen mounted in said game display related first half portion for displaying moving objects and background characters during game play, said display means including a display panel mounted in said display related first half portion;
first and second game control switches mounted in said game control related second half portion of said substantially rectangular front surface for controlling the position of displayed moving objects on said display screen;
a removable external memory for storing a game program and moving object character data and background character data with which images for a game are displayed, said case including an insertion port for receiving said removable external memory;
memory means, disposed within said case and being coupled to said removable external memory means, for receiving background character data and moving object data from said external memory and for storing said background character data and moving object data; and
processing means, coupled to said removable external memory and said memory means, for executing said game program stored in said external memory for controlling the display of moving objects on said display screen of said dot-matrix liquid crystal display in response to the actuation of said first and second game control switches and for controlling the display of background characters on said display screen.

10. A hand-held electronic game machine in accordance with claim 9, further comprising third game control switch means disposed in a central region of said game control related second half portion such that, in use, the third game control switch means is disposed where loci of a player's thumbs of both hands intersect each other on the front surface of said case,
said processing means being responsive to said third game control switch means to start a game, cause the operation of the game to pause, or to select the kind of game to be played.

11. A hand-held electronic game machine in accordance with claim 9, wherein said display screen is disposed, in use, above and between said first game control switch and said second game control switch.

12. A hand-held electronic game machine in accordance with claim 9, further comprising contrast control means, provided on a side surface of said case, for controlling the display screen contrast and means for changing the contrast of said display panel in response to the operation of said contrast control means. is disposed above and said first operation switch and said second operation switch.

13. A hand-held electronic game machine according to claim 9, further comprising
display signal generating means housed in said case and coupled to said processing means, for generating display signals on the basis of said background character data and said moving object character data stored in said memory means; and
a driver for driving said dot-matrix liquid crystal display screen in response to said display signals generated by said display signal generating means to display background characters and moving objects for a game on said display screen of said dot-matrix liquid crystal display screen.

14. A hand-held electronic game machine in accordance with claim 9, wherein said processing means includes detecting means responsive to a connected external memory for detecting whether said connected external memory is an authorized or unauthorized memory.

15. A hand-held electronic game machine in accordance with claim 14 wherein the processing means includes further means responsive to said detecting means for preventing an unauthorized external memory from being used for executing a game program.

16. A hand-held electronic game machine in accordance with claim 9, wherein said insertion portion is disposed beneath said dot-matrix liquid crystal display screen.

17. A hand-held electronic game machine, comprising:
a case of a size which may be held by hand, said case having a front surface and side surfaces;
a dot-matrix liquid crystal display panel having a display screen mounted on said front surface;
a removable external memory for storing a game program and moving object character data and background character data with which images for a game are displayed;
an insertion portion for receiving said removable external memory;
first and second game control switches for controlling the position of moving objects displayed on said display screen of said dot-matrix liquid crystal display screen;
processing means coupled to said first and second game control switches and to said removable external memory for accessing said game program and said moving object character data and background character data to execute said game program;
display memory means for receiving and storing moving object character data and background character data, indicative of character data to be displayed on said display screen of said dot-matrix liquid crystal display screen from said removable external memory, said display memory means including video memory means for storing data corresponding to a plurality of display screens;
register means addressable by said processing means, for selecting the portion of said video memory means to be accessed for display; and
display control means coupled to said dot-matrix liquid crystal display screen and said display memory means for displaying data on said display screen corresponding to the portion of said video memory means selected by said register means.

18. A hand-held electronic game machine according to claim 17, wherein said insertion port is disposed in one of said side surfaces.

19. A hand-held electronic game machine according to claim 17, wherein said display panel is mounted in an upper half portion of said front surface and said first and second game control switches are mounted in a lower half portion of said front surface.

20. A hand-held electronic game machine in accordance with claim 17, further including a control knob disposed on one of said side surfaces and means for adjusting the display panel intensity in response to said control knob.

21. A hand-held electronic game machine according to claim 17, further including an internal ROM, coupled to said processing means, for storing security related data, means for accessing said security related data immediately after power is turned on, said processing means including means for executing an authentication routine using said security related data to determine if said external memory is authentic.

* * * * *

UNITED STATES PATENT AND TRADEMARK OFFICE
CERTIFICATE OF CORRECTION

PATENT NO. : 5,184,830

DATED : February 9, 1993

INVENTOR(S) : Okada et al

It is certified that error appears in the above-identified patent and that said Letters Patent is hereby corrected as shown below:

```
Column  1, line 58, delete "hands'" and insert -- hands --.
Column  2, line 21, delete "on" and insert -- of --;
           line 39, delete "i;:" and insert -- in --.
Column  8, line 50, delete "pellet" and insert -- pallet --.
Column 11, line 26, delete "subsonically rectangularly" and
                    insert -- substantially rectangular --.
           line 27, delete "latitudinal" and insert
                    -- longitudinal --;
           line 51, delete "shown" and insert -- screen --.
Column 13, line 13, delete "means";
           line 61, delete "is dis-";
           lines 62 and 63, delete entirely.
```

Signed and Sealed this

Seventeenth Day of August, 1993

*Attest:*

BRUCE LEHMAN

*Attesting Officer*     *Commissioner of Patents and Trademarks*